United States Patent [19]
Hodges

[11] Patent Number: 5,123,698
[45] Date of Patent: Jun. 23, 1992

[54] BICYCLE SEAT WITH ADJUSTABLE SUPPORT PLATFORMS

[75] Inventor: Marshall W. Hodges, Palestine, Tex.

[73] Assignee: Martec Development, Inc., Colorado Springs, Colo.

[21] Appl. No.: 603,158

[22] Filed: Oct. 25, 1990

[51] Int. Cl.$^5$ .............................................. B62J 1/00
[52] U.S. Cl. ................................. 297/201; 297/195
[58] Field of Search ............... 297/195, 200, 201, 202, 297/196, 198, 203, 204, 205, 206, 207, 312, 284 R, 459, 311; 267/132, 133, 154, 273; 108/64, 103; 211/175

[56] References Cited

U.S. PATENT DOCUMENTS

| | | | |
|---|---|---|---|
| 560,698 | 5/1896 | Dyer | 297/201 |
| 593,331 | 11/1897 | Noirot | 297/201 |
| 619,204 | 2/1899 | Moore | 297/201 |
| 622,357 | 4/1899 | Hitchcock et al. | 297/201 |
| 659,323 | 10/1900 | Richmond | 297/201 |
| 694,875 | 3/1902 | Meighan | 297/201 |
| 1,623,818 | 4/1927 | Tichota | 297/201 |
| 3,784,021 | 1/1974 | Mark | 100/64 X |
| 4,387,925 | 6/1983 | Barker et al. | 297/201 |
| 4,877,286 | 10/1989 | Hobson et al. | 297/195 |

FOREIGN PATENT DOCUMENTS 373620 5/1907 France .................. 297/201

Primary Examiner—Kenneth J. Dorner
Assistant Examiner—James M. Gardner
Attorney, Agent, or Firm—Epstein, Edell & Retzer

[57] ABSTRACT

An adjustable bicycle seat includes first and second support platforms laterally separated by first an second relatively slidable, horizontally oriented, overlapping flanges respectively joined to the first and second support platforms and having a bolt extending through a passage therein to releasably secure the first and second platforms in laterally spaced relation. Each support platform includes an integral spring rotatably mounted in a clamp attachable to a bicycle frame. Apertures formed in the first and second flanges are selectively alignable when the bolt is removed from the passage to permit selective lateral and angular positioning of the first and second support platforms in a horizontal plane, and the bolt is engageable in the aligned apertures to secure the support platforms in such position.

14 Claims, 2 Drawing Sheets

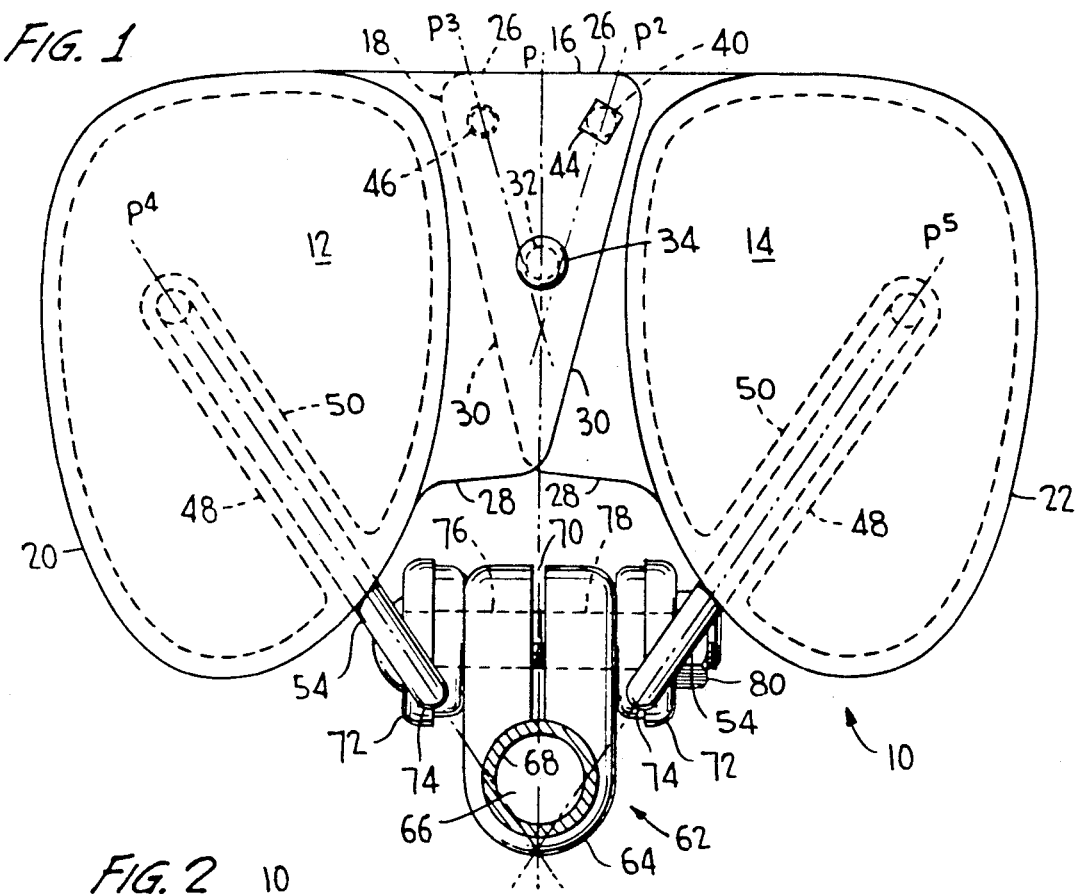
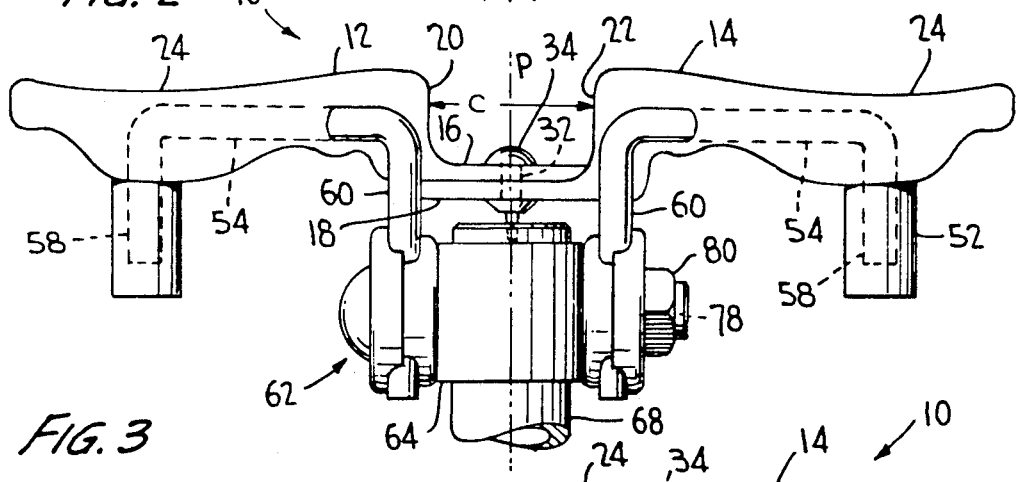
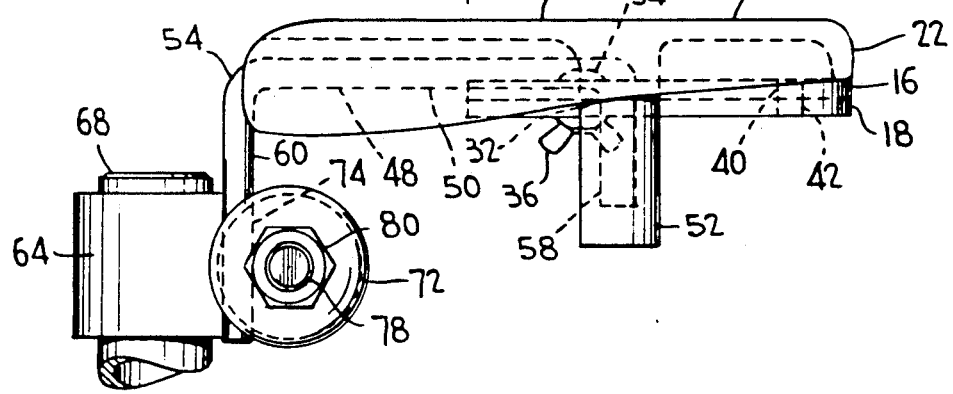

BICYCLE SEAT WITH ADJUSTABLE SUPPORT PLATFORMS

BACKGROUND OF THE INVENTION

1. Field Of The Invention

The invention pertains broadly to a bicycle seat. More particularly, the invention relates to a bicycle seat having adjustable support platforms for rider comfort.

2. Description Of The Prior Art

Conventional bicycle seats typically include a unitary, rigid saddle having a pommel or horn projecting into the crotch of a rider straddling the saddle. Such saddles have many disadvantages, in that the pommel or horn applies pressure to the rider's crotch and creates friction with the rider's legs during pedaling of the bicycle. Thus, abrasion, muscle soreness and general inflammation of the upper thighs and genital area are common maladies in cyclists utilizing conventional saddles. Occasionally, these injuries necessitate medical treatment and/or abstinence from cycling that is equally disruptive to both a professional training regimen and the recreational participation in beneficial exercise. Even when these conditions do not require direct medical intervention, the discomfort caused thereby severely diminishes the rider's cycling pleasure and significantly limits the duration of the rider's workout.

A further drawback possessed by conventional unitary bicycle saddles is that the saddles fail to uniformly support the rider's buttocks Conventional bicycle saddles provide only a small contact area for supporting the entire weight of the rider, and areas of the rider's buttocks supported by the saddle are subjected to intense pressure in relation to unsupported areas. The resulting imbalance between supported and unsupported parts of the rider's anatomy creates an unequal force distribution producing physical discomfort in the pressurized areas and in the rider's pelvis. The rider must engage in constant shifting and repositioning upon the bicycle seat to relieve the anatomical pressure points, and these movements interfere with the cyclist's rhythm and control. Conventional unitary bicycle saddles also compress the flesh of the rider's buttocks together, and the compression produces pressure on the rider's anal sphincter that is a source of additional irritation and discomfort.

The deficiencies associated with conventional bicycle seats deprive the cyclist of the ability to select a seat with confidence that the seat will be comfortable during use. Frequently, a bicycle seat that feels comfortable when evaluated in a shop becomes problematic under actual riding conditions. However, a conventional bicycle seat, once selected, cannot be adjusted or 19 fine-tuned to accommodate the individual anatomical characteristics of the rider and to eliminate discomfort. When a conventional bicycle seat proves to be objectionable, the seat must be completely removed and replaced with another seat that is itself susceptible to the same problems. Frequent removal and replacement of bicycle seats is undesirable because it is costly, time consuming and impairs the rider's familiarity with the performance and "feel" of the bicycle.

Bicycle seats having an adjustable width feature have been proposed, and illustrative bicycle seats are shown in U.S. Pat. Nos. 560,698 to Dyer; U.S. Pat. No. 593,331 to Noirit; U.S. Pat. No. 608,682 to Jamieson; U.S. Pat. No. 619,204 to Moore; U.S. Pat. No. 694,875 to Meighan; U.S. Pat. No. 1,623,818 to Tichota; U.S. Pat. No. 4,387,925 to Barker et al and U.S. Pat. No. 4,877,286 to Hobson et al. Conventional adjustable width bicycle seats also typically include a pommel or horn extending into the rider's crotch and, as previously discussed, this structure is the source of numerous adverse effects. Additionally, conventional adjustable bicycle seats are generally very structurally complex and include a large number of extraneous components that increase the manufacturing and assembly costs of the seat and are prone to failure during use. Conventional adjustable bicycle seats usually require special tools to adjust the seat, as well as an intricate adjustment protocol, and on-road, spontaneous adjustments are difficult, if not impossible, to perform. Furthermore, conventional adjustable bicycle seats generally possess a range of adjustment that is inadequate to obtain comfort for the physical proportions of a vast majority of riders and, consequently, conventional adjustable bicycle seats have proven to be ineffective and have failed to gain rider acceptance.

An additional factor affecting a cyclist's comfort relates to the structure mounting the bicycle seat on a bicycle frame. Although some conventional bicycle seats include mounting structure having a spring for absorbing bumps and vibrations transmitted to the seat through the bicycle frame, the spring is typically a separate, individual component that must be mounted on the bicycle frame and the seat with additional hardware. Such springs are generally ineffective in absorbing vibrations imposed on the bicycle seat, and contribute further to the manufacturing and assembly costs of the bicycle. Additionally, the springs tend to become loose during cycling and, therefore, require frequent monitoring and maintenance.

SUMMARY OF THE INVENTION

Accordingly, it is an object of the invention to provide a bicycle seat that eliminates friction in the rider's crotch.

An additional object of the invention is to provide a bicycle seat that eliminates pressure in the rider's genital area.

It is also an object of the invention to provide a bicycle seat that uniformly supports the weight of the rider over a relatively large contact area.

Another object of the invention is to provide a bicycle seat that separates the rider's buttocks.

A still further object of the invention is to provide a bicycle seat that is laterally and angularly adjustable in a horizontal plane.

Yet another object of the invention is to provide a bicycle seat that is easily adjustable without the need for special tools.

An additional object of the invention is to provide a bicycle seat that is simple in design.

Yet a further object of the invention is to provide a bicycle seat having an integral spring.

Accordingly, these and other objects, benefits and advantages are obtained with the bicycle seat of the present invention as characterized by a first support platform and a second support platform laterally spaced from the first support platform by a pair of overlapping, relatively slidable, horizontally oriented flanges that are unitarily integrally joined, respectively, to the first and second support platforms. Each of the support platforms includes an upper surface elevated with respect to the overlapping flanges, and contoured and configured to independently support a buttock of a rider. A longitudinal passage is formed through the overlapping flanges and has a central longitudinal axis contained in a first vertical plane bisecting the flanges. An externally threaded bolt extends through this passage and an internally threaded wing nut is carried on the end of the bolt to permit the first and second support platforms to be secured in laterally spaced relation. A first hole is formed through one of the flanges to be disposed on one side of the first vertical plane, and has a central longitudinal axis contained in a second vertical plane that angularly intersects the first vertical plane A second hole is formed through the other of the flanges to be disposed on the opposite side of the first vertical plane and has a central longitudinal axis contained in a third vertical plane that angularly intersects the first vertical plane symmetrically to the second vertical plane. A spring is integrally joined to each of the support platforms, and each spring includes a vertically oriented depending leg positioned exteriorly of the respective support platform to be rotatably mounted in a respective passage in a clamp for securing the bicycle seat at a desired vertical height on the seat support post of a bicycle frame. The threaded bolt can be removed from the longitudinal passage in the overlapping flanges, and the first and second support platforms can be rotated in a horizontal plane around the depending legs of the springs to selectively align the first and second holes in the overlapping flanges and, therefore, increase the lateral separation between the support platforms. The bolt can be inserted through the aligned holes, and the wing nut can be applied to the bolt to secure the first and second support platforms in the laterally and angularly adjusted position.

BRIEF DESCRIPTION OF THE DRAWINGS

These and other objects, features and many of the attendant advantages of the present invention will be appreciated more readily as they become better understood from a reading of the following description considered in connection with the accompanying drawings wherein like parts in each of the several figures are identified by the same reference characters, and wherein:

FIG. 1 is a top plan view of the bicycle seat of the present invention;

Fig 2 is a front view of the bicycle seat of the present invention;

FIG. 3 is a side view of the bicycle seat of the present invention;

DESCRIPTION OF THE PREFERRED EMBODIMENT

Figure 4:
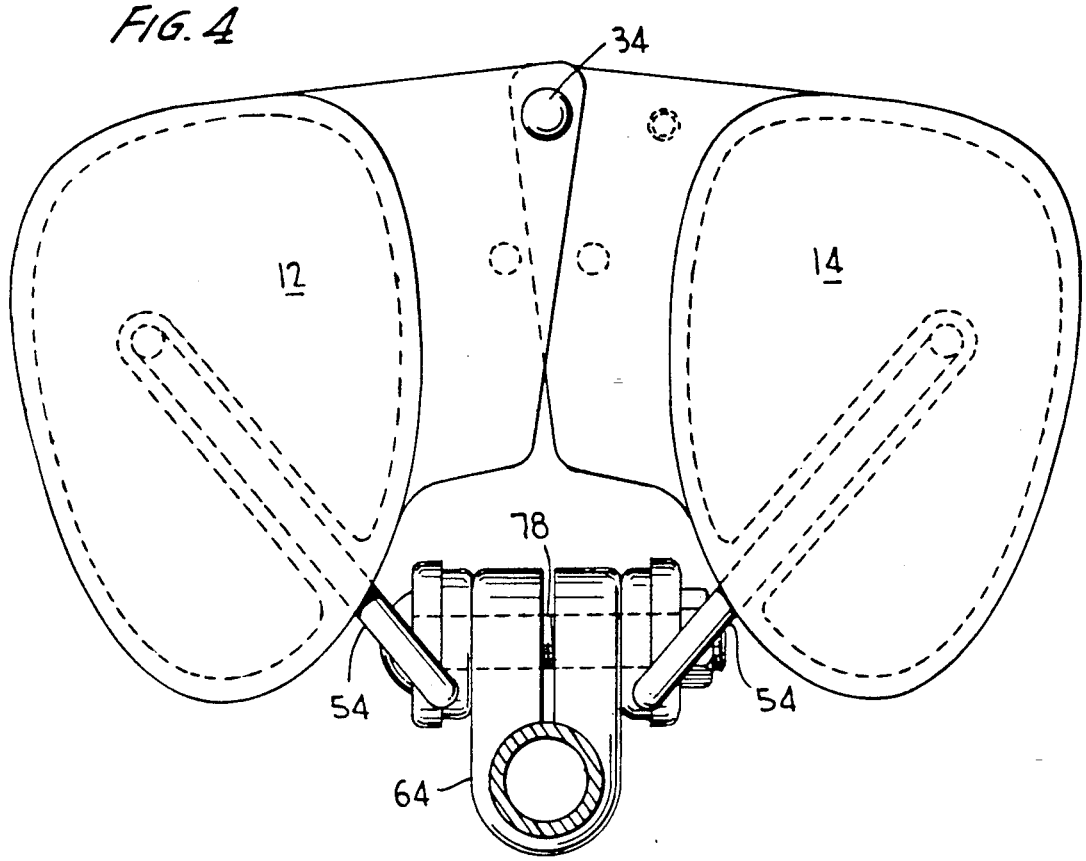
FIG. 4 is a top plan view of the bicycle seat of the present invention showing a selective alternative position for the support platforms of the bicycle seat.

With reference to FIGS. 1-4, the bicycle seat 10 of the present invention includes a first support platform 12, a second support platform 14 laterally spaced from first support platform 12, and contacting flanges 16 and 18 joined, respectively, to the first and second support platforms to be centrally disposed therebetween in slidable overlapping arrangement. As particularly illustrated in FIGS. 1 and 2, the first and second support platforms 12 and 14 are defined, respectively, by a generally ovate peripheral wall 20 and 22 joined to a generally concave upper surface 24 configured to individually support a buttock of a rider seated on the support platforms. Flange 16 is joined to the peripheral wall 20 of first support platform 12 in submerged relation to upper surface 24 to extend horizontally toward second support platform 14, and flange 18 is joined to the peripheral wall 22 of second support platform 14 in submerged relation to upper surface 24 to extend horizontally toward first support platform 12 and closely underlying flange 16. Flanges 16 and 18 each include a rear edge 26 joined to the respective peripheral walls 20 and 22, a front edge 28 joined to the respective peripheral walls 20 and 22, and a side edge 30 angularly joining rear edge 26 to front edge 28. Side edges 30 are joined to front edges 28 at an obtuse angle, such that the side edges 30 taper from the front edges 28 laterally outwardly in the direction of the opposing support platform to join the rear edges 26 at an acute angle. Flange 16 is slidably positioned over flange 18 to define a lateral clearance C separating the adjacent peripheral walls 20 and 22 of the first and second support platforms 12 and 14. A vertically oriented, longitudinal passage 32 is formed through the overlapping flanges 16 and 18 and includes a longitudinal central axis positioned centrally between rear edges 26 and front edges 28 of the contacting overlapping flanges. The axis is contained in a vertical plane P bisecting the overlapping flanges 16 and 18 from front edges 28 to rear edges 26 and dividing clearance C between next adjacent peripheral walls 20 and 22 into two substantially equal parts. A bolt 34 is disposed in passage 32, and includes an externally threaded end for projecting beneath flange 18 when the bolt 34 is positioned in passage 32. An internally threaded wing nut 36 is threadedly engageable on the projecting end of bolt 34 to be longitudinally movable on the bolt for selectively securing flanges 16 and 18 in overlapping fashion and for selectively disengaging the flanges.

A hole 40 is formed through flange 16 proximate rearward edge 26 and side edge 30 of the flange to be positioned between plane P and support platform 14, and a hole 42 is formed through flange 18 in vertical alignment with hole 40. A bolt 44 can be positioned through the aligned holes 40 and 42 to further secure the flanges in overlapping arrangement. A hole 46 is formed through flange 18 proximate rearward edge 26 and side edge 30 of the flange to be positioned on the opposite side of plane P symmetrically with respect to hole 40. Hole 40 includes a longitudinal central axis contained in a vertical plane $P^2$ that angularly intersects plane P to form an acute angle therewith, and hole 46 similarly includes a longitudinal central axis contained in a vertical plane $P^3$ that angularly intersects plane P symmetrically with respect to plane $P^2$ to define a substantially identical acute angle with plane P as depicted in FIG. 1.

As illustrated in FIGS. 1-3, a spring holder 48 is formed on the lower surface of the first and second support platforms 12 an 14. Each spring holder 48 includes a horizontally oriented, tubular channel 50 extending through the respective peripheral walls 20 and 22, and a vertically oriented tubular channel 52 joined to the horizontal channel 50 to extend downwardly from the lower surface of the respective support platforms. Channels 50 include longitudinal central axes contained in a common horizontal plane perpendicularly intersecting plane P; however, the longitudinal central axis of channel 50 for first support platform 12 is contained in a vertical plane P⁴ angularly intersecting plane P to form an acute angle therewith on one side of plane P, while the longitudinal central axis of channel 50 for second support platform 14 is contained in a vertical plane P⁵ disposed on the opposite side of plane P and angularly intersecting plane P symmetrically with respect to plane P⁴. Channels 52 for first support platform 12 and second support platform 14 include longitudinal central axes disposed, respectively, in planes P⁴ and P⁵.

Figure 5:
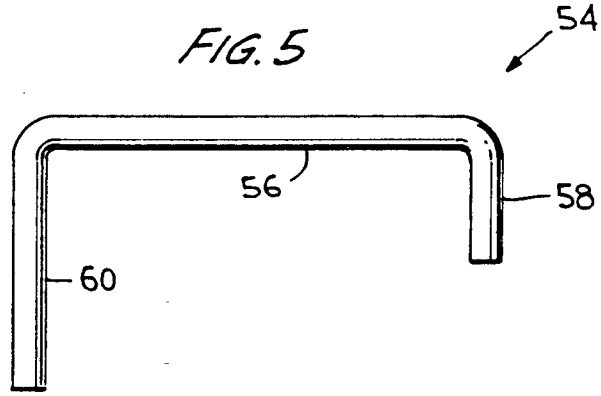
FIG. 5 is a side view of the spring of the bicycle seat of the present invention.

Springs 54, independently support each of the first and second support platforms, are disposed in each spring holder 48 and, as shown in FIG. 5, spring 54 includes a longitudinally elongated, tubular body 56 unitarily, integrally joined to a finger 58 depending perpendicularly downward from one end of body 56 and a mounting leg depending perpendicularly downward from the opposite end of body 56. Each spring 54 is disposed in a respective spring holder 48 to have finger 58 retained in channel 52 and body 56 retained in channel 50, with a portion of body 56 projecting through the peripheral wall of the respective support platform to position mounting leg 60 exteriorly of the peripheral wall. A clamp 62 for rotatably supporting mounting legs 60 of springs 54 includes a collar 64 defining an annular cavity 66 having a vertically oriented, central longitudinal axis contained in plane P for receiving the vertically oriented, tubular seat support post 68 on a bicycle frame, a slot 70 extending through collar 64 to communicate with cavity 66 and a pair of ears 72 laterally flanking collar 64. A longitudinal tubular opening 74 is formed in each ear parallel to cavity 66 to be disposed symmetrically in planes P⁴ and P⁵ on opposite sides of and in laterally spaced relation to plane P, and mounting legs 60 of springs 54 are rotatably mounted within openings 74 for pivotally supporting support platforms 12 and 14 upon clamp 62. A bore 76 is formed through collar 64 and ears 72 to intersect slot 70 perpendicularly to cavity 66. A headed bolt 78 having an externally threaded shank is disposed in bore 76 to have the end of the shank extend exteriorly of an ear 72, and an internally threaded nut 80 is threadedly engaged on the end of bolt 78. Nut 80 can be threadedly advanced upon bolt 78 to selectively close slot 70 and, therefore, annular cavity 66, to tighten collar 64 around the seat support post 68. Preferably, the first and second support platforms 12 and 14 are each fabricated as a unitary, integral molding of lightweight material, such as Type 6 nylon plastic, although other plastic materials can be employed. Upper surface 24 of each support platform is preferably configured to include approximately twelve square inches of surface area to maximize the contact area over which the rider's weight is distributed. Springs 54 are preferably integrally molded with the first and second support platforms 12 and 14 by placing them into the support platform mold, and then injecting plastic material into the mold to form channels 50 and 52 around the springs to prevent lateral, rotational and reciprocal movement of the springs in relation to the support platforms. It is preferred that side edges 30 of flanges 16 and 1 be joined angularly to rear edges 26 such that the side edges are contained in vertical planes disposed symmetrically on opposite sides of plane P parallel to planes P² and P³ and defining an acute angle of approximately fifteen degrees with plane P when flanges 16 and 18 are secured via bolt 34 in passage 32. Preferably, holes 40 and 46 are formed, respectively, in flanges 16 and 18 to have their longitudinal central axes positioned approximately one half inch laterally perpendicular to plane P and approximately three eighths inch forwardly of rear edges 26 such that, when flanges 16 and 18 are secured by bolt 34 in passage 32, the lateral distance between centers on support platforms 12 and 14 is approximately five and one half inches.

In operation, the vertical seat support post 68 on a conventional bicycle frame is positioned in annular cavity 66 in collar 64, and bolt 78 is positioned in bore 76. Nut 80 is placed on the end of bolt 78 projecting from ear 72, and the nut is advanced upon the bolt with the appropriate tools to close slot 70 and reduce the size of cavity 66 to tighten collar 64 around the seat support post 68 at a desired position along the vertical length of the seat support post. When the rider sits on seat 10, each buttock is independently supported by the support platforms 12 and 14, and the submerged position of overlapping flanges 16 and 18 with respect to the upper surface 24 of the support platforms eliminates structure from the rider's crotch and, therefore, removes undesirable pressure in this anatomical area. Because each buttock is independently supported by a support platform separated by clearance C, and because the center to center distance between support platforms is preferably five and one half inches when flanges 16 and 18 are secured via bolt 34 in passage 32, the rider's buttocks are likewise separated to allow flexing of the anal sphincter and to prevent pressure and irritation in the rider's anal area. Depending upon the rider's particular anatomical characteristics, additional separation of the first and second support platforms 12 and 14 may be required for maximum comfort. In this case, wing nut 36 can be easily removed from bolt 34 without the need for any special tools, and bolt 34 can be withdrawn from passage 32. Once bolt 34 has been removed from passage 32, the first and second support platforms 12 and 14 can be 8 rotated in a horizontal plane relative to clamp 62 to vertically align hole 40 in flange 16 with hole 46 in flange 18, such rotation 10 being permitted due to pivotal movement of spring mounting legs 60 in openings 74 in clamp 62. In the rotated position for support 12 platforms 12 and 14 shown in FIG. 4, the longitudinal central axis through the aligned holes 40 and 46 is contained in plane P, and 14 bolt 34 can be inserted through the aligned holes to secure the flanges via wingnut 36 and obtain a center to center lateral separation for the support platforms 12 and 14 of approximately six and one half inches.

Having described a preferred embodiment of a new and improved bicycle seat constructed in accordance with the invention, it is believed that other modifications, variations and changes will be suggested to those skilled in the art in view of the teachings set forth herein It is therefore to be understood that all such variations, modifications and changes are believed to fall within the scope of the present invention as defined by the appended claims.

What is claimed is:

1. A bicycle seat comprising
a first support platform;
a second support platform laterally spaced from said first support platform;
a first contacting flange extending laterally from said first support platform toward said second support platform;
a second contacting flange extending laterally from said second support platform toward said first support platform and slidably contacting said first contacting flange in overlapping engagement;

means for independently supporting each of said first and second support platforms;

a first opening through said first flange;

a second opening through said second flange alignable with said first opening to position said support platforms in a first laterally spaced position wherein said support platforms are separated by a first clearance;

securing means removably insertable through said first and second openings when said first and second openings are aligned for releasably securing said support platforms in said first laterally spaced position;

a first aperture through said first flange independent of said first opening; and a second aperture through said second flange independent of said second opening and selectively alignable with said first aperture when said securing means is removed from said first and second openings to position said support platforms in a second laterally spaced position wherein said support platforms are separated by a second clearance greater than said first clearance, said securing means being removably insertable through said first and second apertures when said first and second apertures are aligned to releasably secure said first and second support platforms in said second laterally spaced position.

2. A bicycle seat as recited in claim 1 wherein said first and second support platforms include upper surfaces configured to individually support a buttock of a bicycle rider.

3. A bicycle seat as recited in claim 2 further including a first central longitudinal axis extending through said first and second openings when said first and second openings are aligned and a second central longitudinal axis extending through said first and second apertures when said first and second apertures are aligned, and wherein said first and second axes are disposed in spaced parallel relation in a first plane bisecting said first and second clearances and disposed perpendicular to said first and second flanges.

4. A bicycle seat as recited in claim 3 wherein said securing means includes a bolt.

5. A bicycle seat as recited in claim 4 wherein said first aperture is bisected by a second plane disposed perpendicular to said first flange and said second aperture is bisected by a third plane disposed perpendicular to said second flange when said first and second openings are aligned, said second and third planes being disposed symmetrically with said first plane, said second plane containing a first line extending from a center of said first opening to a center of said first aperture, said third plane containing a second line extending from the center of said first opening to a center of said second aperture, said first and second lines intersecting said first plane at an angle of approximately 10° when measured in a direction perpendicular with said first plane.

6. A bicycle seat for a bicycle comprising a firs support platform;

a second support platform laterally spaced from said first support platform;

a first flange joined to said first support platform, said first flange including a front edge extending laterally from said first support platform toward said second support platform a first distance, a rear edge extending laterally from said first support platform toward said second support platform a second distance greater than said first distance and a side edge angularly joining said front and rear edges;

a second flange joined to said second support platform and disposed in overlapping relation with said first flange, said second flange including a front edge extending laterally from aid second support platform toward said first support platform substantially said first distance, a rear edge extending laterally from said second support platform toward said first support platform substantially said second distance and a side edge angularly joining said second flange front and rear edges;

a first opening in said first flange disposed centrally between said first flange front and rear edges;

a second opening in said second flange disposed centrally between said second flange front and rear edges and alignable with said first opening;

securing means removably insertable through said first and second openings when said first and second openings are aligned for releasably securing said first and second platforms in a first laterally spaced, angular position;

a first aperture in said first flange disposed adjacent said first flange rear and side edges;

a second aperture in said second flange disposed adjacent said second flange rear and side edges and alignable with said first aperture when said securing means is removed from said first and second openings, said securing means being removably insertable through said first and second apertures when said first and second apertures are aligned for selectively, releasably securing said first and second support platforms in a second laterally spaced, angular position;

spring means integral with said first and second support platforms for independently support said first and second support platforms; and clamp means for mounting said spring means upon a bicycle; said spring means rotatable within said clamp means to permit said first and second support platforms to be selectively moved to said first and second positions.

7. A bicycle seat as recited in claim 6 wherein said first and second support platforms each include a peripheral wall and said front and rear edges are unitarily integrally joined to said peripheral walls.

8. A bicycle seat as recited in claim 7 further including upper surfaces joined to said peripheral walls, respectively, for supporting a rider and lower surfaces disposed beneath said upper surfaces, wherein said spring means includes a first spring disposed adjacent said first support platform lower surface and a second spring disposed adjacent said second support platform lower surface and further including channels unitarily, integrally formed on said lower surfaces, respectively, for holding said first and second springs adjacent said lower surfaces.

9. A bicycle seat as recited in claim 8 wherein said first and second springs each include a body disposed in said channels and a depending leg extending perpendicularly from said body exteriorly of said peripheral walls.

10. A bicycle seat as recited in claim 9 further including passage means in said clamp means for independently rotatably receiving said depending legs.

11. A bicycle seat as recited in claim 10 wherein said passage means each includes a central longitudinal axis and said first and second springs are respectively rotatable relative to said clamp means around said passage means axes, said passage means axes being perpendicular to said first and second flanges.

12. A bicycle seat as recited in claim 11 wherein said first and second support platforms are made from unitary integral molding of plastic material.

13. A bicycle seat as recited in claim 12 wherein said channels are respectively molded integrally with said first and second support platforms.

14. A bicycle seat as recited in claim 13 wherein said first and second support platforms are separated by a first clearance when said first and second openings are aligned and by a second clearance greater than said first clearance when said first and second apertures are aligned and further including a first plane disposed perpendicular to said first and second flanges and bisecting said first and second clearances, said passage means axes being respectively contained in planes symmetrically disposed on opposite sides of said first plane at an acute angle with said first plane.

* * * * *